United States Patent [19]
Yates

[11] 3,979,913
[45] Sept. 14, 1976

[54] METHOD AND SYSTEM FOR UTILIZING WASTE ENERGY FROM INTERNAL COMBUSTION ENGINES AS ANCILLARY POWER

[76] Inventor: Harold P. Yates, R.F.D. No. 2, Far Hills, N.J. 07931

[22] Filed: Jan. 20, 1975

[21] Appl. No.: 542,094

[52] U.S. Cl. .................................. 60/618; 60/624
[51] Int. Cl.² ................... F01K 23/06; F01K 23/14
[58] Field of Search ..................... 60/618, 615, 624

[56] References Cited
UNITED STATES PATENTS

| | | | |
|---|---|---|---|
| 1,339,177 | 5/1920 | Dyer | 60/618 |
| 2,196,980 | 4/1940 | Campbell | 60/618 |
| 2,428,905 | 10/1947 | Bilan | 122/40 |
| 2,490,547 | 12/1949 | Schraner et al. | 122/40 X |
| 2,737,014 | 3/1956 | Bush | 60/618 |
| 2,790,428 | 4/1957 | Buttler | 122/40 X |

Primary Examiner—Allen M. Ostrager
Attorney, Agent, or Firm—Martha G. Pugh

[57] ABSTRACT

A system for increasing the efficiency of an internal combustion engine by converting the waste energy to drive a turbine. Output power from the turbine is used to supplement the basic power of the engine or to provide power to auxiliary systems such as the electrical generator, compressor type air conditioner, power assist steering mechanism and power assist brakes. In a disclosed embodiment, a thermostatically actuated valve is responsive to heat build-up in the engine to direct a stream of water on a water based liquid from a reserve tank into a steam generating chamber utilizing the waste heat of the engine where it is converted to high pressure steam which drives a turbine. The turbine shaft is mechanically coupled to supplement the power of the engine and/or to provide power to one or more of the auxiliary systems mentioned above through a series of jackshaft attachments.

8 Claims, 3 Drawing Figures

METHOD AND SYSTEM FOR UTILIZING WASTE ENERGY FROM INTERNAL COMBUSTION ENGINES AS ANCILLARY POWER

BACKGROUND OF THE INVENTION

This relates in general to methods and apparatus for increasing the input-output efficiencies of internal combustion engines and, more particularly, to the utilization of waste heat generated during the operation of an internal combustion engine by supplementing the basic power output of the engine and/or for performing auxiliary functions which presently require the consumption of additional fuel.

It is common knowledge that the input-output efficiency of engines of the internal combustion type is relatively low, because operation inherently produces a high percentage of energy that is not usefully employed and is vented to the atmosphere. In fact, effective devices are used to dissipate this energy away from the engine. The only use now made of this unwanted energy is the heating of automobile and truck interiors.

It is also known that certain accessories needed for the proper operation of the engine consume power that could be applied to augment the primary function of output power. If the engine is used as a source of power for a vehicle, such as an automobile or truck, various types of convenience accessories, such as compressor type air conditioning, power assist brakes, and power assist steering mechanisms, reduce the power available to propel the vehicle, all of which require an increased consumption of fuel.

SUMMARY OF THE INVENTION

It is, therefore, a principal object of the present invention to provide more efficient use of energy generated in the operation of an internal combustion engine.

A more specific object of the invention is to utilize the presently wasted heat energy generated by the engine to supplement the basic engine efficiency, thereby effecting a saving of fuel consumed by the engine or permitting the use of a smaller engine for a required power output.

Another object of the invention is to operate or assist in the operation of some or all of the usual automotive accessories, such as compressor type air conditioning, power steering, power brakes, by more fully utilizing the waste heat and other waste energy, such as that due to the ignition and burning of compressed fuel mixtures, which are generated during operation of the conventional engine.

These and other objects are realized in accordance with the present invention in a system in which the waste energy generated during operation of a conventional internal combustion engine is used to supplement the basic power output of the engine used to propel the vehicle and/or to supply an auxiliary power source for certain powered functions, such as an electrical generator, compressor type air conditioning, power assist brakes, power assist steering and the like.

One embodiment of the present invention comprises a system in which the waste heat of the internal combustion engine is utilized to generate steam from a circulating stream of water or a water based liquid to operate a turbine whose rotating shaft is mechanically coupled to supplement the basic power of the engine, and/or to provide supplemental power for certain of the auxiliary functions mentioned above by means of a series of jackshafts connected to the turbine shaft.

The circulating stream of water or water based liquid, which may or may not be derived from the engine cooling system, passes through a pump operated by the vehicle engine to pump the stream from a reserve tank through a conduit system including pressure relief valves and a thermostatically actuated three-way solenoid valve which is normally open in a direction to return the pumped stream of water to the reserve tank. A heat responsive switch, mounted on or immediately adjacent the engine manifold, is connected for operating the solenoid valve. When the engine starts, the valve is positioned so that the water pump circulates water through the pressure relief valve and back to the reserve tank. As the engine manifold reaches the steam generating temperature after several minutes, the thermostatic switch actuates the solenoid of the three-way valve directing water or water based liquid to a hydraulic atomizing nozzle. The liquid flows into the atomizing nozzle in a volume which is controlled by the rate of rotation of the pump and, hence, the rate of turnover of the engine. The atomizing nozzle injects spray into a steam generating chamber which is located along the axis of the manifold. The high temperature, high pressure steam provides power for driving a steam turbine. The exhaust steam from the turbine may either be exhausted to the atmosphere or condensed and returned to the reserve tank for the water or water based liquid where it is available for recycling. When the engine is turned off, the pump ceases to supply liquid to the atomizing nozzle and the supplementary power is also turned off. If the engine is again started before the manifold cools, the thermostatically actuated valve is still positioned to divert liquid to the atomizing nozzle and steam is generated immediately.

A particular advantage of the present invention is that it would result in the development of smaller engines with reduced fuel requirements which would accordingly produce a lower degree of atmospheric pollution. An indirect, but most important advantage of the present invention, is that it would result in substantial savings in the daily depletion of the world's reserve of fuels.

These and other objects, features and advantages will be apparent to those skilled in the art upon a detailed study of the invention with reference to the appended drawings.

DETAILED DESCRIPTION

As used in connection with the detailed specification of the invention and claims hereinafter, reference will be had to the following definitions of terms:

Water will be construed as including water based liquids such as normally used in an engine cooling system and would be sufficient to generate a head of steam, which liquids will be deemed to be the equivalent of water for the purposes of the present invention.

Heat Energy will be construed as including all potential heat energies developed in the engine, the exhaust manifold, the exhaust system, the engine's cooling system and any other energies not presently used in the direct production of usable output power, including such supplementary sources as the excess output of an electrical generator not being used to contribute to engine operation or recharging a storage battery, but used to generate heat. It is contemplated that these individual sources can be used separately or additively. The term "heat energy" will also be construed to include the use of the aforesaid heat sources as a heat component in fuel cell operation for the development of electricity.

Steam Generation will be construed as including the generation of steam from water, vapor from any liquid or combination of liquids, the conversion of low pressure vapor to high pressure vapor, or any other well-known method for converting heat energy into rotary motion. It is contemplated, in accordance with the present invention, that such conversion can be carried out either by a regular boiler or by flash injection conversion, using either an open or recycled system. The conventional engine cooling system may or may not be part of the auxiliary cooling system of the present invention.

It is anticipated, in accordance with a preferred embodiment of the present invention, that steam can be generated by a simple redesign of the engine exhaust manifold in a manner to be explained in detail hereinafter, or by using heat directly or indirectly available from the engine or any of the engine's components, plus any available supplementary heat source.

Turbine, as set forth hereinafter, is construed as including such well-known devices as steam turbines, piston steam engines or equivalent systems for converting heat energy to rotary motion by the generation or expansion of vapor or gas as set forth in the previous paragraph.

Figure 1:
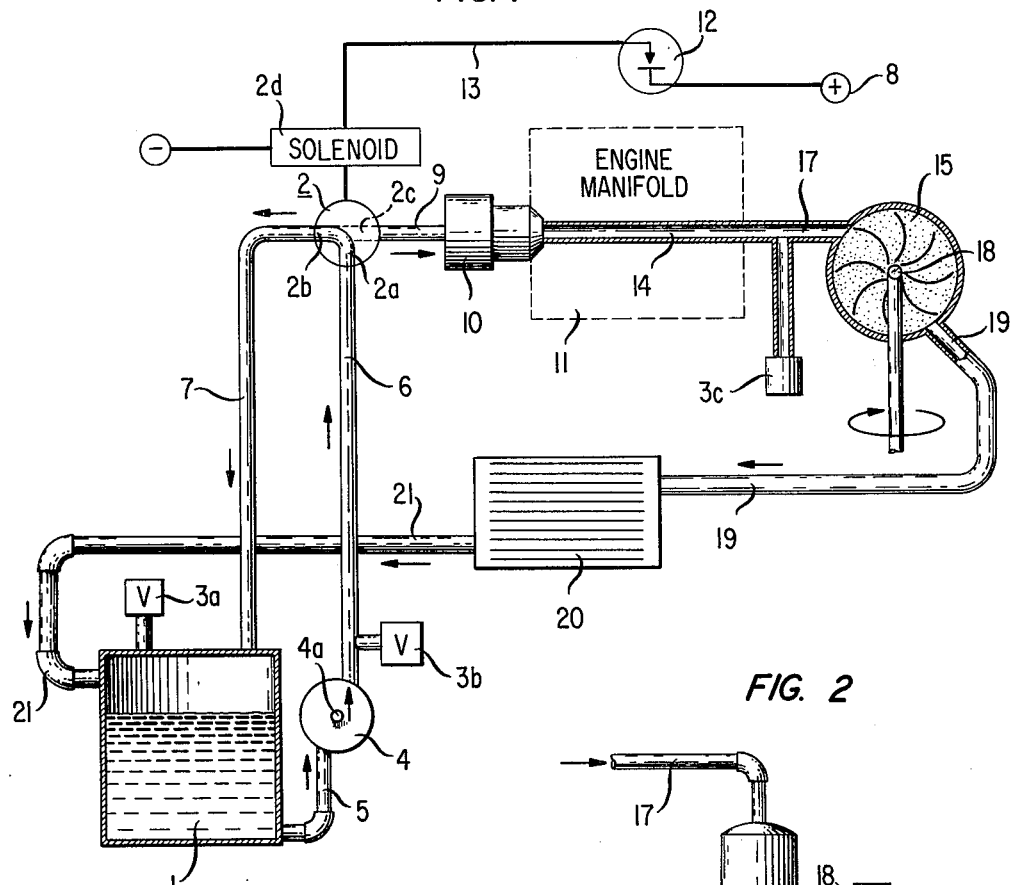
FIG. 1 is a schematic showing of a preferred form of the power saving system of the present invention.

Referring in detail to FIG. 1 of the drawings, there is shown an ancillary system in accordance with one embodiment of the present invention for saving power normally dissipated in the form of heat by operation of an internal combustion engine of the type usually employed to drive automotive vehicles.

It is contemplated that the ancillary system of the present invention will be mounted on the engine or in conjunction with the chassis of a conventional automobile or similar vehicle, which has not been shown, for the sake of simplicity, except for parts actually involved with the ancillary system.

In FIG. 1, the tank 1, which may or may not be part of the conventional engine cooling system, as desired, may be of conventional construction of suitable metal and having an interior of sufficient size to accommodate about two cubic feet of water or any water based liquid conventionally used in the cooling systems of automotive engines, such as water containing antifreeze.

The tank 1 is connected through a conventional pipe or conduit system which may, for example, comprise metal tubing or conduits which are either flexible or of bendable soft metal such as copper or aluminum, and having an internal diameter of, say, three-eighths inch. The outlet conduit 5, leading out from the bottom of tank 1 passes into the intake of the pump 4. In the present example, the latter is a conventional hydraulic circulating pump capable of a maximum delivery of 30 gallons per hour at a pressure of, say, 200 pounds per square inch. The pump is driven centrifugally by a central shaft 4a, which is connected to the main engine shaft (not shown). Thus, pump 4 is driven by the conventional vehicle engine and changes the output volume pumped according to the changes in the speed of the engine.

The output from pump 4 passes through the outlet conduit 6 to the intake orifice 2a of the thermally actuated solenoid valve 2. The latter is a three-way directional flow valve, having, in addition to the intake orifice 2a, normally-open exhaust orifice 2b and normally-closed exhaust orifice 2c. The valve 2 may, for example, be in the form of solenoid operated valve, Model 55C, manufactured by the Valcor Engineering Company of Kenilworth, New Jersey, as shown in their catalog 130, page 5. The solenoid 2d is operated by means of a conventional type of thermostatic switch 12 connected at one terminal to the solenoid through an electrical lead line 13, and at the other terminal to the positive pole of the source of power 8 which may, for example, be the car battery, which in the present example is 12 volts. The negative pole of the power source is connected to solenoid 2d to complete the circuit.

The thermostatic switch 12 is mounted on the engine manifold 11 and is constructed to close at a temperature of, say, 250° F. (120° C.) and to remain operated continuously until the temperature of the manifold drops below 220° F. (105° C.). Switch 12 may, for example, be an on-off normally open switch of the type made by Ulanet Company of Newark, N.J., under the designation Model 110.

When solenoid 2d is not energized, valve opening 2b is normally open, so that water flows through conduit 6, through the valve 2 and is returned to the tank through inlet conduit 7. When solenoid 2d is actuated, valve opening 2b is closed and opening 2c is opened, causing water to flow from valve 2 into the hydraulic atomizing nozzle 10. In the present example, the latter has an orifice of about 0.076 inch, providing a hollow cone spray pattern using about 28 gallons per hour at 100 pounds per square inch pressure. For the purposes of the present invention, this device may be of the type manufactured by Spraying Systems, Inc. of Bellwood, Illinois, which is shown as Model ¼ LN-W in their catalog 25A, page 35.

The output end of the atomizing nozzle 10 is coupled into one end of an axial metal pipe chamber 14, about three-fourths inch in inner diameter and the length of the manifold, which can be molded into the manifold 11 at the time it is manufactured.

As the engine manifold 11 reaches a temperature of about 250° F. (120° C.), after the automobile engine has been running for a period of several minutes, the switch 12 closes, actuating solenoid 2d, which operates to close the normally-open valve opening 2b and open the normally-closed valve 2c, so that water is injected through the hydraulic atomizing nozzle 10 and into the chamber 14, continuously producing high temperature, high pressure steam. The steam develops a maximum pressure of about 250 pounds per square inch as the manifold heats up to its normal operating temperature.

The high pressure steam passes through the output end of pipe 14 into the intake of the steam turbine 15. In the present example, this is a small unit about 5 inches in diameter which is constructed to develop an output power of approximately 24 horsepower at the turbine shaft 18, before gear reduction. The turbine 15 may take the form, for example, of Model 4K manufactured by Carling Turbine Blower Co., Worcester, Mass., and shown in their Model 4K literature.

The exhaust steam from turbine 15 is condensed in unit 20 and returned for recycling through the output vent 21 which is connected near the top of the reserve tank 1. It will be understood, however, that the steam need not be returned, but can be simply vented to the atmosphere in an alternative arrangement of the system. The unit 20 may take the form of any well-known condenser unit, such as an automobile radiator. Condenser unit 20 is located in the passage between the outlet pipe 19 and input 21 to tank 1, and should preferably be located below the level of turbine 15, but above the level of the input to tank 1.

It will be noted that the safety of the system is assured by the use of pressure relief valves 3a, 3b and 3c. Valves 3a and 3b are respectively disposed in positions shown in FIG. 1, at the top of tank 1, and/or screwed into the conduit 6. In the present example, units 3a and 3b have a safety relief of 250 pounds per square inch. They may take the form of Model 6514 manufactured by Hoke, Inc. of Cresskill, N.J., and shown on page 4 of their catalog SV 27120. Unit 3c releases at 500 pounds per square inch and may take the form of Hoke, Inc. Model 6528.

Figure 2:
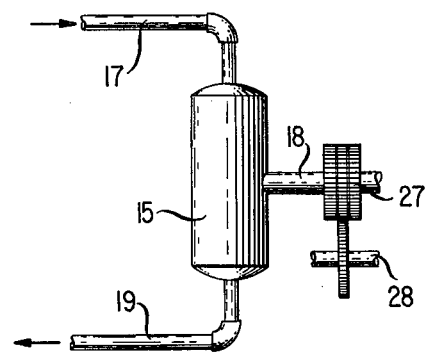
FIG. 2 is a side elevational showing of the turbine of FIG. 1, illustrating a possible type of mechanical coupling to the engine crankshaft.

Referring to FIG. 2, there is shown the steam turbine 15 in side elevation with rotatable shaft 18 mechanically coupled to the engine's crankshaft 28 through a gear train 27. By this device the extra power generated through the operation of the ancillary system, including steam turbine 15, serves to continually supplement the power generated by the engine and, thus, to save fuel. It will be understood that the manner of coupling shown by way of example in FIG. 2 is only one of many possible ways in which the auxiliary power from turbine 15 can be coupled to augment the basic power of the engine. It will be apparent to those skilled in the art that the ancillary power source and the basic power source can be coupled to the engine crankshaft through any well-known means, such as a gear train, belt, chain, fluid coupling, electric generator-motor coupling or the equivalent, as desired.

Further, in addition to permitting the development of smaller engines with reduced fuel requirements, the use of an ancillary power system in accordance with the present invention, coupled to supplement the basic power of the engine, would have the following advantages:

The continuous output power of turbine operation would aid in smoothing out piston pulsations, especially in two, four and six cylinder engines.

The flexibility of the ancillary turbine power would readily synchronize with piston engine output without complicated mechanisms.

Today's fast starting, characteristic of piston engines, would not be downgraded because the turbine wheel will revolve freely if driven by the piston engine before steam generation.

The ancillary power source would be automatically synchronized with the desired output of the basic engine power requirements.

The advantages of the ancillary power system would not materially increase either engine costs or engine weight.

Nonoperation of the ancillary power source would not interrupt operation of the basic power.

Temperature reduction in the exhaust system, because of the generation of steam, would be beneficial to the life of its several parts, including the emission control components.

Figure 3:
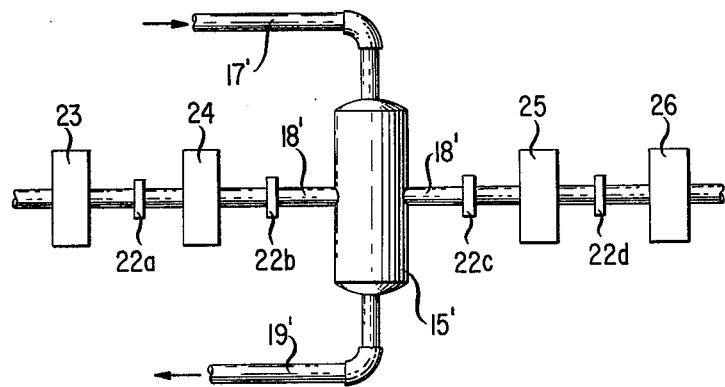
FIG. 3 is a modification of FIG. 2, showing an augmented turbine shaft coupled to engine accessories normally powered by the basic engine.

Referring to FIG. 3 of the drawings, there is shown a further extension of the ancillary power system of the present invention. The shaft 18' of the steam turbine 15' is extended by the use of jackshafts attached by means of couplings 22a, 22b, 22c and 22d, in a manner well-known in the art, to drive a plurality of devices which may include any or all of the following vehicle auxiliaries: conventional power steering device 23, conventional power brakes 24, an electric generator 25, etc., and a compressor 26 for an air conditioning system. The auxiliary devices listed are merely illustrative of the devices which can be driven wholly or at least partially by reclaimed waste energy using the ancillary system of the present invention. Other prospective uses of the power derived in accordance with the present invention are to power a household type refrigeration system or an electrical heat source in a recreational vehicle.

A further modification of the system of the present invention is to utilize the output power of the steam turbine 15 to drive an electric generator which can power an electric motor, this motor to be mechanically connected to supplement the engine's basic power replacing the mechanical linkage outlined in FIG. 2.

Many different types of combinations of the basic power of the engine with the supplementary power generated in accordance with the teachings of the present invention will be apparent to those skilled in the art. The invention is not limited to the specific forms disclosed by way of example, but only by the claims set forth hereinafter.

What is claimed is:

1. A system for utilizing the heat build-up in an internal combustion engine having its basic power coupled to drive a vehicle, which comprises in combination:

an enclosure disposed to be heated by heat dissipated by said engine, a source of water or water based liquid designed to circulate as a stream in a closed system including a reserve tank and a system of conduits under control of a three-way thermostatically actuated valve, said valve having an intake orifice and normally-open and normally-closed exhaust orifices, said intake orifice being connected to receive the outflow stream from said tank, said normally-open exhaust orifice connected to return said stream to said tank, said valve having heat sensor means adjacent said engine, disposed to open said normally-closed exhaust orifice at a preselected temperature, means including a spray nozzle connected to said normally-closed orifice, and disposed upon the opening of said orifice to inject a fine spray of water or water based liquid into said enclosure under high pressure for continuously generating high pressure steam in said enclosure in response to heat dissipated by said engine, a turbine having a rotatable shaft, means for directing said steam to drive said turbine to rotate, and means for deriving power from the rotation of the shaft of said turbine for supplementing the basic power of said internal combustion engine.

2. The combination in accordance with claim 1 wherein said enclosure takes the form of a pipe formed integrally with the manifold of said engine which comprises a direct path through said manifold.

3. The combination in accordance with claim 1 which includes an electrical generator, wherein said means for deriving power from the rotation of the shaft of said turbine comprises a coupling between said turbine shaft and said electrical generator.

4. The combination in accordance with claim 1 wherein the exhaust steam from said turbine is connected by conduit means through a condenser unit to said reserve tank whereby said steam is condensed and returned to said reserve tank for recycling.

5. The combination in accordance with claim 1 wherein said thermostatically actuated valve means comprises a solenoid operated valve, and said heat sensor means for energizing said solenoid includes a heat sensitive switch disposed to operate and remain operated at said preselected temperature.

6. The combination in accordance with claim 1 wherein said means for deriving power from the rotation of the shaft of said turbine comprises means for mechanically coupling said turbine shaft and the crankshaft of said engine.

7. The combination in accordance with claim 6 wherein said coupling means includes fluid couplings.

8. The combination in accordance with claim 1 wherein said means for deriving power from the shaft of said turbine comprises jackshaft means connected to drive at least one vehicle auxiliary.

* * * * *